US011415269B2

(12) United States Patent
Shim et al.

(10) Patent No.: US 11,415,269 B2
(45) Date of Patent: Aug. 16, 2022

(54) SYSTEM AND METHOD FOR SENSING HYDROGEN CHARGE STATE OF FUEL CELL ELECTRIC VEHICLE

(71) Applicants: Hyundai Motor Company, Seoul (KR); Kia Motors Corporation, Seoul (KR)

(72) Inventors: Ji Hyun Shim, Seoul (KR); Ki Ho Hwang, Seoul (KR); Hyung Ki Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/126,545

(22) Filed: Dec. 18, 2020

(65) Prior Publication Data
US 2021/0123567 A1 Apr. 29, 2021

Related U.S. Application Data

(62) Division of application No. 15/826,460, filed on Nov. 29, 2017, now Pat. No. 10,900,611.

(30) Foreign Application Priority Data

Oct. 13, 2017 (KR) .................. 10-2017-0132953

(51) Int. Cl.
*F17C 13/02* (2006.01)
*B60L 53/00* (2019.01)
(Continued)

(52) U.S. Cl.
CPC .............. *F17C 13/02* (2013.01); *B60L 53/00* (2019.02); *B60L 58/30* (2019.02); *F17C 5/06* (2013.01);
(Continued)

(58) Field of Classification Search
CPC ........ F17C 2250/0478; F17C 2250/034; F17C 2265/065; B67D 7/348; B67D 2007/0469; B67D 2007/0474
See application file for complete search history.

(56) References Cited

U.S. PATENT DOCUMENTS 10,040,680 B2 ‡ 8/2018 McNicholas ........ B67D 7/0401
10,219,709 B2 ‡ 3/2019 Basu .................. A61B 5/02433
(Continued)

FOREIGN PATENT DOCUMENTS

CN 104555921 A 4/2015
CN 104602935 A 5/2015
(Continued)

OTHER PUBLICATIONS

Signal Conditioning IC for Proximity Sensors Application Note 5375, AVAGO, Apr. 4, 2008, 30 pages.

*Primary Examiner* — Timothy P. Kelly
(74) *Attorney, Agent, or Firm* — Fox Rothschild LLP

(57) ABSTRACT

A system and a method for sensing hydrogen charge state of a fuel cell electric vehicle are provided. The system includes an infrared transmission unit that transmits a fuel door sensing infrared signal for sensing a fuel door opened while charging hydrogen and a nozzle sensing infrared signal for sensing a charging station-side hydrogen charging nozzle connected to a hydrogen charging inlet of a vehicle. An infrared reception unit receives the fuel door sensing infrared signal and thereafter, reflected on a fuel door and the nozzle sensing infrared signal transmitted from the infrared transmission unit and thereafter, reflected on the hydrogen charging nozzle. A controller determines that the vehicle is being charged with hydrogen when sensing an open state of the fuel door and a hydrogen charging inlet connection state of the hydrogen charging nozzle.

9 Claims, 3 Drawing Sheets

(51) Int. Cl.
  *B60L 58/30* (2019.01)
  *H04B 10/114* (2013.01)
  *F17C 5/06* (2006.01)

(52) U.S. Cl.
  CPC .. *H04B 10/1143* (2013.01); *F17C 2205/0376* (2013.01); *F17C 2221/012* (2013.01); *F17C 2223/0123* (2013.01); *F17C 2223/035* (2013.01); *F17C 2250/034* (2013.01); *F17C 2250/0478* (2013.01); *F17C 2250/0486* (2013.01); *F17C 2260/036* (2013.01); *F17C 2265/065* (2013.01); *F17C 2270/0139* (2013.01); *F17C 2270/0168* (2013.01); *F17C 2270/0581* (2013.01)

(56) References Cited

U.S. PATENT DOCUMENTS

| | | | | |
|---|---|---|---|---|
| 10,240,542 | B1 ‡ | 3/2019 | Salter | F02D 41/22 |
| 2008/0185912 | A1 ‡ | 8/2008 | Tighe | B60L 58/30 |
| | | | | 307/10.1 |
| 2013/0146176 | A1 * | 6/2013 | Yahashi | F17C 5/06 |
| | | | | 141/4 |
| 2014/0170530 | A1 ‡ | 6/2014 | Kawaura | F17C 5/06 |
| | | | | 429/515 |
| 2017/0233243 | A1 | 8/2017 | McNicholas | |
| 2020/0386369 | A1 * | 12/2020 | Ito | H01M 8/04 |

FOREIGN PATENT DOCUMENTS

| | | | | |
|---|---|---|---|---|
| CN | 105599629 | A | 5/2016 | |
| JP | 2010-020910 | A ‡ | 1/2010 | |
| JP | 2010-020910 | A | 1/2010 | |
| JP | 2011-47491 | A | 3/2011 | |
| JP | 5434200 | B2 ‡ | 3/2014 | G08C 23/04 |
| JP | 5434200 | B2 | 3/2014 | |
| JP | 2016-096056 | A ‡ | 5/2016 | H01M 8/04089 |
| JP | 2016-096056 | A | 5/2016 | |
| KR | 10-0507077 | B1 ‡ | 8/2005 | |
| KR | 10-0507077 | B1 | 8/2005 | |
| KR | 2012-0064447 | A ‡ | 6/2012 | B60L 58/33 |
| KR | 2012-0064447 | A | 6/2012 | |

\* cited by examiner
‡ imported from a related application

SYSTEM AND METHOD FOR SENSING HYDROGEN CHARGE STATE OF FUEL CELL ELECTRIC VEHICLE

CROSS-REFERENCE TO RELATED APPLICATION

This application is a Divisional of U.S. Application Ser. No. 15/826,460 filed on Nov. 29, 2017, which claims under 35 U.S.C. § 119(a) the benefit of Korean Patent Application No. 10-2017-0132953 filed Oct. 13, 2017, the entire contents of which are incorporated herein by reference.

BACKGROUND

(a) Technical Field

The present disclosure relates to a system and a method for sensing a hydrogen charge state of a fuel cell electric vehicle, and more particularly, to a system and a method for sensing a hydrogen charge state that more accurately sense whether hydrogen is charged in a fuel cell electric vehicle.

(b) Background Art

In general, a fuel cell electric vehicle is a vehicle that uses a fuel cell stack as a main power source of a vehicle, and is driven by driving an electric motor with electric energy generated in the fuel cell stack. The fuel cell stack electrochemically reacts hydrogen, which is fuel gas supplied by a hydrogen supply device including a hydrogen tank, with oxygen in the air, which is an oxidant gas supplied by an air supply device including a blower or a compressor to generate electric energy.

In the fuel cell electric vehicle, hydrogen is stored as fuel in a safe and compact manner. Various hydrogen storage technologies have been developed to satisfy both an increase in a mileage of the vehicle and safety. Among the various hydrogen storage technologies, it is common to charge hydrogen in a hydrogen tank that has a light weight and a high strength and is capable of withstanding high pressure and to secure a riding space and to secure a sufficient traveling distance, a hydrogen tank is widely used, which is chargeable with hydrogen at high pressure such as a 350 bar or 700 bar specification.

As described above, since the fuel cell electric vehicle uses hydrogen as fuel, a hydrogen storage system for storing hydrogen needs to be installed and the high-pressure hydrogen storage system of 700 bar which is highest at a current commercialization level is currently often installed. The fuel cell electric vehicle is periodically charged with hydrogen in a charging station and in this case, where the hydrogen is pressurized at a high pressure state to be charged in the hydrogen tank of the vehicle. In particular, in the 700-bar high-pressure hydrogen storage system, the hydrogen pressure increases up to 875 bar and a temperature is allowed up to 85° C. while charging.

To secure the safety while hydrogen charging, a hydrogen charging speed needs to be adjusted and accordingly, the charging station and the vehicle communicate with each other while charging in a key-off state and data such as pressure or temperature in the hydrogen storage system, which is measured in the vehicle is provided to the charging station via a communication therebetween. Particularly, although a wired or wireless communication may be performed between the charging station and the vehicle, recently, an infrared ray communication established by SAE J2799 which is a wireless communication protocol has been used.

While charging hydrogen, the starting of the vehicle is restricted to protect a driver, a passenger, and a staff of the charging station and accordingly, a technology for sensing a charging situation in the vehicle is required. More specifically, as a hydrogen storage technique of a currently commercial fuel cell electric vehicle, a high-pressure hydrogen storage is unique and high-pressure hydrogen is charged by using differential pressure between the charging station and the hydrogen storage system of the vehicle.

To charge the hydrogen at the high pressure, a path is provided to transfer the high-pressure hydrogen between the charging station and the vehicle. During a charging process, a receptacle, which is a hydrogen charging inlet of the vehicle and a nozzle of the charging station are joined to each other and when accurate joining is achieved, the high-pressure hydrogen flows to the hydrogen storage system of the vehicle from a dispenser of the charging station through a high-pressure hose, the nozzle, and the receptacle. In particular, when the vehicle rushes due to a malfunction by the driver or carelessness of the driver, the nozzle is broken or a connector between the high-pressure hose and the vehicle is separated, resulting in a potential high-pressure hydrogen leak.

Accordingly, in the fuel cell electric vehicle, it is necessary to prevent such a danger by determining whether the hydrogen is currently charged in the vehicle, and then, limiting the starting of the vehicle when the hydrogen is charged and thus, a technology capable of accurately sensing whether the hydrogen is charged in the fuel cell electric vehicle is required.

The above information disclosed in this section is merely for enhancement of understanding of the background of the invention and therefore it may contain information that does not form the prior art that is already known in this country to a person of ordinary skill in the art.

SUMMARY

The present invention provides a system and a method for sensing a hydrogen charge state, which more accurately sense whether hydrogen is charged in a fuel cell electric vehicle.

In one aspect, the present invention provides a system for sensing a hydrogen charge state of a fuel cell electric vehicle that may include: an infrared transmission unit configured to transmit a fuel door sensing infrared signal to sense whether a fuel door is open while charging hydrogen and a nozzle sensing infrared signal to sense a charging station-side hydrogen charging nozzle connected to a hydrogen charging inlet of a vehicle; an infrared reception unit configured to receive the fuel door sensing infrared signal transmitted from the infrared transmission unit and thereafter, reflected on a fuel door and the nozzle sensing infrared signal transmitted from the infrared transmission unit and thereafter, reflected on the hydrogen charging nozzle; and a controller configured to determine that the vehicle is being charged with hydrogen in response to sensing an open state of the fuel door and a hydrogen charging inlet connection state of the hydrogen charging nozzle through the infrared reception unit.

In another aspect, the present invention provides a method for sensing a hydrogen charge state of a fuel cell electric vehicle that may include: transmitting, by an infrared transmission unit, a fuel door sensing infrared signal to sense whether a fuel door is open while charging hydrogen; transmitting, by the infrared transmission unit, a nozzle sensing infrared signal to sense a charging station-side hydrogen charging nozzle connected to a hydrogen charging inlet of a vehicle; receiving, by an infrared reception unit, an infrared signal; and determining, by a controller, that the vehicle is being charged with hydrogen in response to sensing an open state of the fuel door and a hydrogen charging inlet connection state of the hydrogen charging nozzle based on the infrared signal received by the infrared reception unit.

As a result, a system and a method for sensing a hydrogen charge state of a fuel cell electric vehicle according to the present invention may more accurately sense that hydrogen is actually charged in the fuel cell electric vehicle and prevent a safety problem due to rushing of a vehicle while charging high-pressure hydrogen. According to the present invention, since a non-contact type sensing scheme using light is used, an exposition proof criterion may be fulfilled and an explosion proof related problem in charging the high-pressure hydrogen is easily solved.

In other words, it may be possible to implement non-contact type fuel door opening and nozzle sensing functions for transmitting infrared rays and detecting whether hydrogen is charged from the received infrared rays. Therefore, spark generation which occurs when the contact type sensing system in the related art is used, and the resulting hydrogen ignition and a risk of explosion may be prevented. However, in the related art, only an opening state of a fuel door may be sensed by a contact type, but in the present invention, since a hydrogen charging nozzle (a charging station-side nozzle) actually connected to a hydrogen charging inlet (receptacle) of a vehicle for charging hydrogen is sensed in addition to the fuel door, it may be possible to prevent a detection error when applying the non-contact type sensing scheme.

Since both the fuel door and the nozzle are sensed, it may be possible to prevent starting and rushing of the vehicle when the nozzle of the charging station is actually connected to the vehicle for charging hydrogen, not in a state where only the fuel door is opened and it may be possible to prevent a malfunction and an unnecessary starting limitation of the vehicle compared to a simple configuration of sensing only opening of the fuel door. In other words, only when the hydrogen is actually charged while the nozzle of the charging station is connected to the vehicle, the starting of the vehicle may be limited and the rushing of the vehicle may be prevented.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
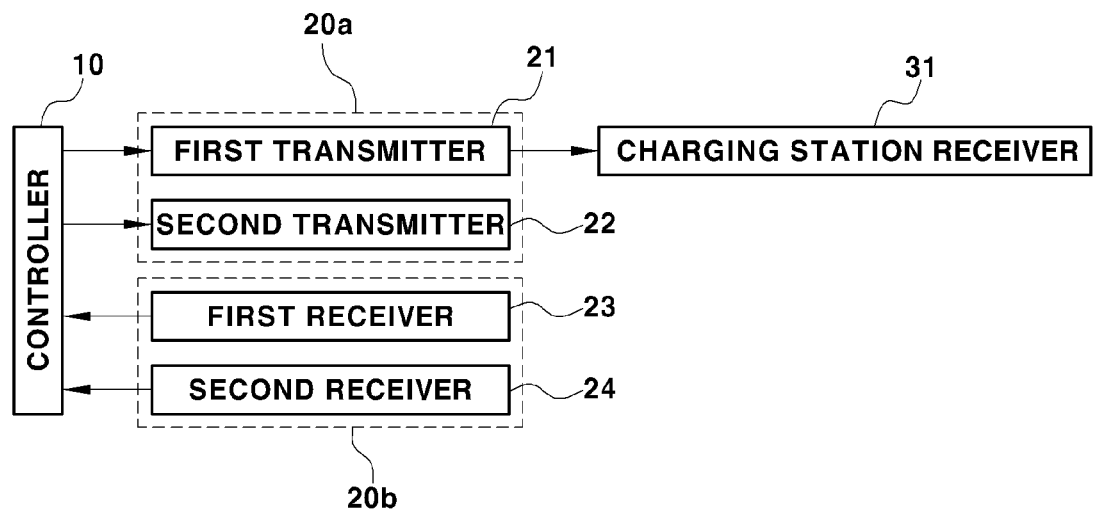
FIG. 1 is a block diagram illustrating a configuration of a system for sensing a hydrogen charge state according to an exemplary embodiment of the present invention.

Reference numerals set forth in the Drawings includes reference to the following elements as further discussed below:

1: fuel door
2: hydrogen charging inlet
10: controller
20a: infrared transmission unit
20b: infrared reception unit
21: first transmitter
22: second transmitter
23: first receiver
24: second receiver
30: charging station receiver It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention has been made in an effort to provide a system and a method for sensing a hydrogen charge state, which more accurately sense whether hydrogen is charged in a fuel cell electric vehicle. In the present invention, in response to sensing that the hydrogen charging of a vehicle is performed, starting of a vehicle may be restricted from being turned on, and as a result, it may be possible to prevent unintentional vehicle rushing during hydrogen charging and to prevent a life accident due to nozzle separation or damage while charging.

As is known, known infrared (IR) communication performed between the vehicle and the charging station during the hydrogen charging of the fuel cell electric vehicle aims at data communication for transmitting and receiving data required for hydrogen charging control for the vehicle. The known infrared (IR) communication performed between the fuel cell electric vehicle and the charging station is one-way communication in which data is transferred from the vehicle to the charging station. To perform the hydrogen charging control for the vehicle, for example, the known infrared (IR) communication may be performed for optimizing an increase in temperature in a hydrogen storage system (hydrogen tank) of the vehicle, which occurs while charging high-pressure hydrogen, to control the hydrogen charging in the vehicle.

Pressure and temperature data in the hydrogen storage system measured by sensors in the vehicle during the hydrogen charging via the infrared (IR) communication are provided to the charging station, and as a result, the hydrogen charging control such as controlling a charging speed, etc. may be performed to achieve safe hydrogen charging in the vehicle and the charging station according to a rule.

As described above, data transmission and reception are performed via the infrared (IR) communication between the fuel cell electric vehicle and the charging station, which is defined in SAE J2601, which is a charging standard of the hydrogen charging station. In many charging stations, according to the rule of SAE J2601, the infrared communication with the vehicle is currently performed. SAE J2601 is a rule for charging hydrogen at 700 bar within about 3 minutes while preventing the temperature of the hydrogen storage system (hydrogen tank) from exceeding about 85° C. during the hydrogen charging of the fuel cell electric vehicle and a rule for guaranteeing that the high-pressure hose and the hydrogen charging nozzle of the charging station are accurately connected to the vehicle and the hydrogen storage system before the hydrogen charging.

Currently, the infrared (IR) communication between the vehicle and the charging station takes a one-way communication scheme in which data is transmitted by the vehicle and data is received by the charging station. Accordingly, an ordinary fuel cell electric vehicle is provided with an infrared transmitter ('first transmitter' in FIG. 1) for data transmission and the charging station for the hydrogen charging is provided with an infrared receiver ('charging station receiver' in FIG. 1) for the data reception.

In considering the above, a system and a method for sensing a hydrogen charge state according to the present invention may be configured to sense whether the hydrogen is charged using the infrared transmitter previously provided in the vehicle for data communication. In the present invention, in addition to the infrared transmitter, which is installed for the data communication, an infrared receiver (which may include a first receiver and a second receiver to be described later) configured to receive an infrared signal reflected from the fuel door and the hydrogen charging nozzle may be additionally provided in the vehicle.

Figure 2:
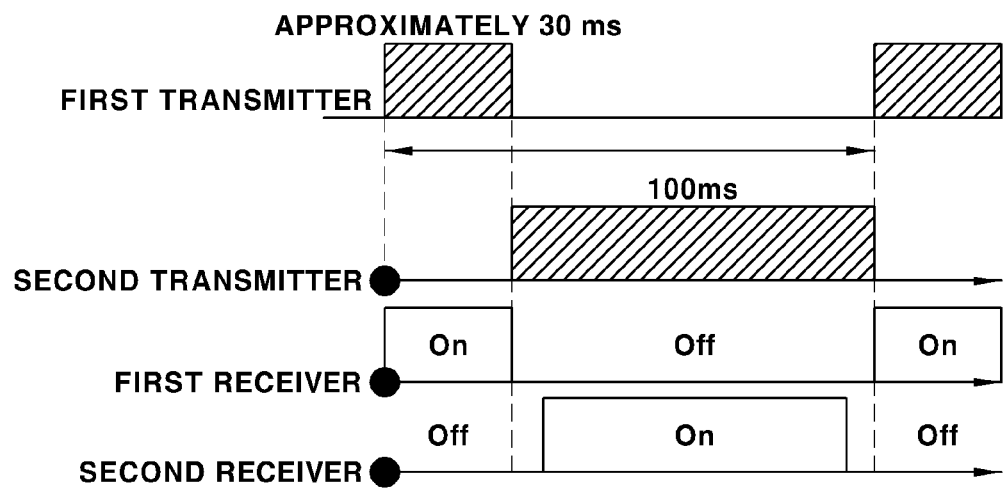
FIG. 2 is a diagram illustrating infrared-ray transmitting and receiving states in a system and a method for sensing a hydrogen charge state according to an exemplary embodiment of the present invention.
Figure 3:
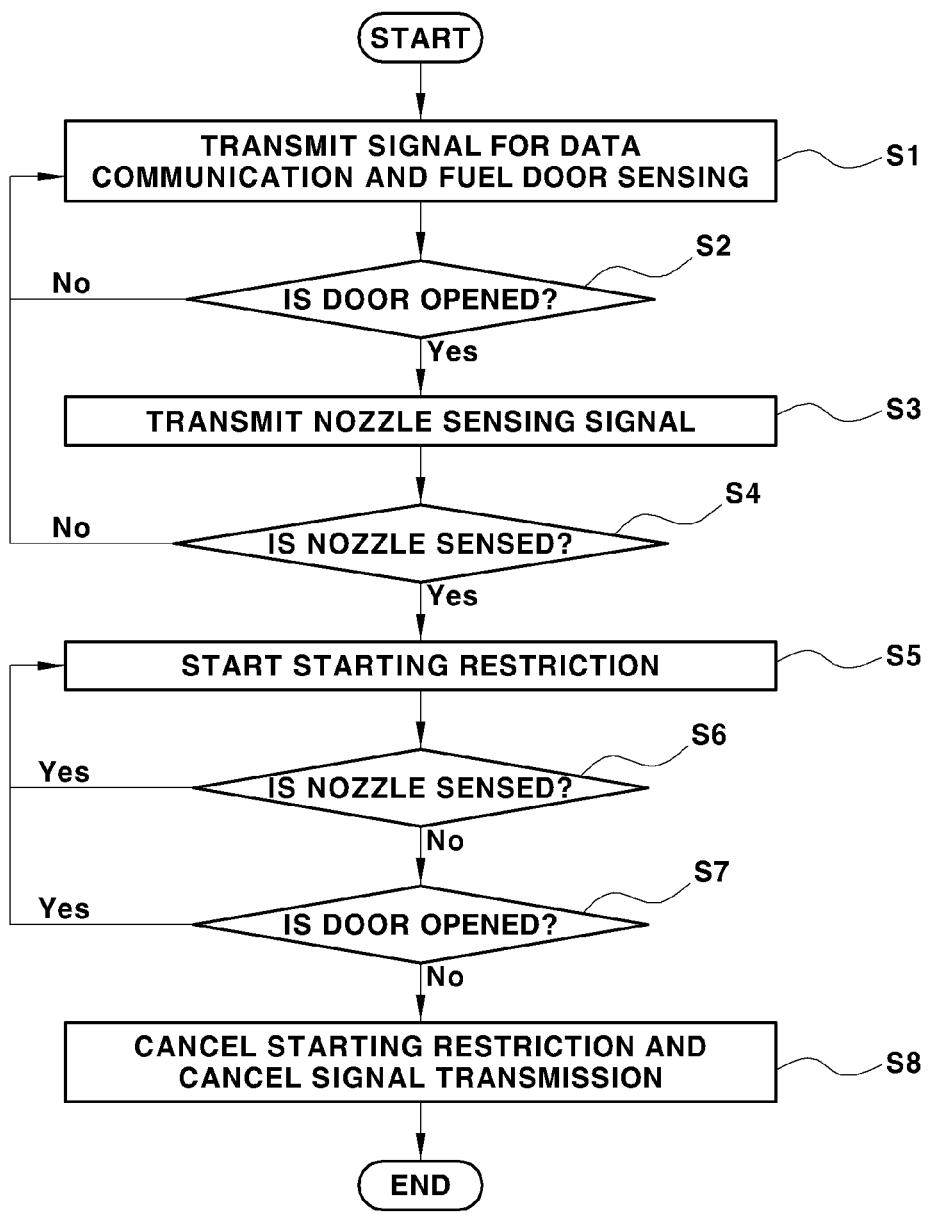
FIG. 3 is a flowchart illustrating a method for sensing a hydrogen charge state according to an exemplary embodiment of the present invention.
Figure 4:
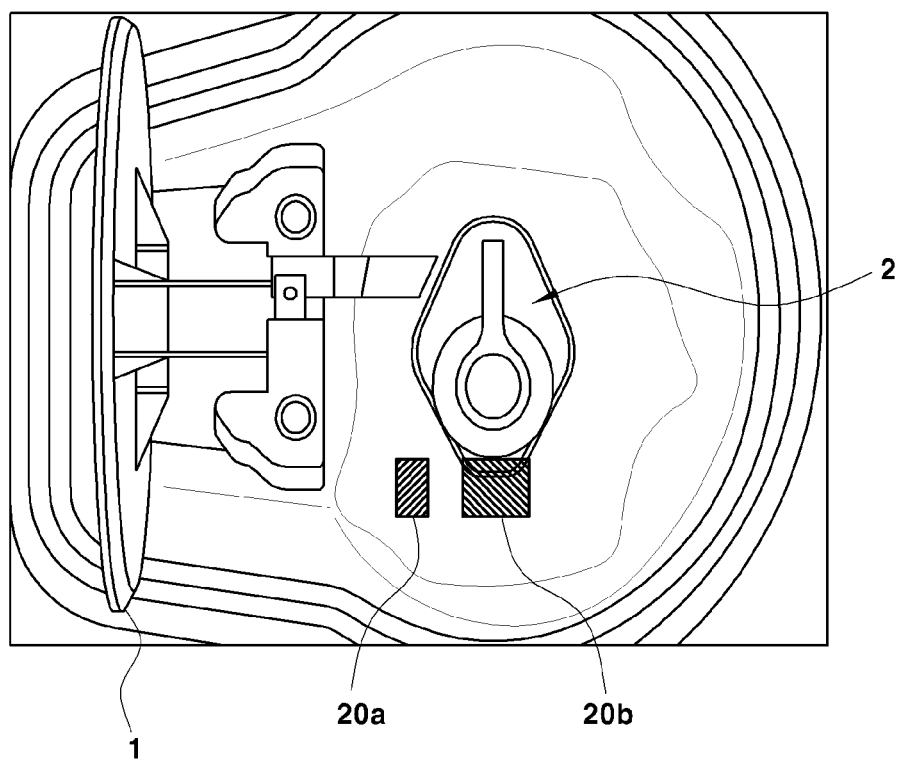
FIG. 4 is a diagram illustrating installation states of an infrared transmission unit and an infrared reception unit in a system for sensing a hydrogen charge state according to an exemplary embodiment of the present invention.

Hereinafter, exemplary embodiments of the present invention will be described in more detail with reference to the drawings. FIG. 1 is a block diagram illustrating a configuration of a system for sensing a hydrogen charge state according to an exemplary embodiment of the present invention and FIG. 2 is a diagram illustrating infrared-ray transmitting and receiving states in a system and a method for sensing a hydrogen charge state according to an exemplary embodiment of the present invention. FIG. 3 is a flowchart illustrating a method for sensing a hydrogen charge state according to an exemplary embodiment of the present invention and FIG. 4 is a diagram illustrating installation states of an infrared transmission unit and an infrared reception unit in a system for sensing a hydrogen charge state according to an exemplary embodiment of the present invention.

First, the system for sensing a hydrogen charge state according to the present invention may include an infrared transmission unit 20a configured to selectively transmit a fuel door sensing infrared signal to sense whether a fuel door 1 installed in a vehicle is open while charging hydrogen and a nozzle sensing infrared signal to sense a charging station-side hydrogen charging nozzle (not illustrated) connected to a hydrogen charging inlet of the vehicle and an infrared reception unit 20b installed in the vehicle and configured to receive infrared signals transmitted from the infrared transmission unit 20a and thereafter, reflected on a hydrogen charging nozzle (hereinafter, abbreviated as a 'nozzle') connected to the fuel door 1 and the hydrogen charging inlet.

In particular, the fuel door sensing infrared signal transmitted by the infrared transmission unit 20a may be transmitted to sense and determine a state of the fuel door and may be reflected only in the fuel door 1 closed to cover the hydrogen charging inlet 2. When the fuel door 1 is opened, the fuel door sensing infrared signal may not reach the fuel door 1 (reflection is impossible) or even though the fuel door sensing infrared signal reaches the fuel door 1 and is reflected on the fuel door 1, the reflected signal may not reach the infrared reception unit 20*b*.

When the nozzle is not connected to the hydrogen charging inlet 2, the nozzle sensing infrared signal transmitted by the infrared transmission unit 20*a* may not reach the nozzle, and as a result, the nozzle sensing infrared signal may not be reflected on the nozzle and the nozzle sensing infrared signal may not be received by the infrared reception unit 20*b*. The hydrogen charge state sensing system according to the present invention may further include a controller 10 configured to execute driving and output of the infrared transmission unit 20*a* and determine whether the vehicle is currently charged with hydrogen based on the infrared signal received by the infrared reception unit 20*b*.

In the present invention, the infrared transmission unit 20*a*, which is provided to output two types of distinguished infrared signals, that is, the fuel door sensing infrared signal and the nozzle sensing infrared signal, may include a plurality of infrared transmitters 21 and 22 having different outputs or may be one integrated infrared transmitter configured to output two types of divided infrared signals at different times. When the infrared transmission unit 20*a* includes the plurality of infrared transmitters, the infrared transmission unit 20*a* may further include an infrared transmitter 21 configured to output the fuel door sensing infrared signal and an infrared transmitter 22 configured to output the nozzle sensing infrared signal.

Hereinafter, the infrared transmitter 21 configured to output the fuel door sensing infrared signal will be referred to as the first transmitter and the infrared transmitter 22 configured to output the nozzle sensing infrared signal will be referred to as the second transmitter in the present invention. Even when the first transmitter 21 and the second transmitter 22 are provided as described above, the two transmitters may be operated by the controller 10 to output the infrared rays with a time difference and when one integrated infrared transmitter is provided, the output of the integrated infrared transmitter may be adjusted in which the controller 10 may be configured to alternately output two types of signals with a time difference.

It may be possible to operate the integrated infrared transmitter to output the two types of infrared signals classified as described above, either in software or in hardware. Since the software and a circuit configuration for adjusting the output of the infrared transmitter so that one infrared transmitter alternately outputs two types of infrared signals selectively and with a time difference is the known art, a detailed description will be omitted.

As the exemplary embodiment of the present invention, FIG. 1 illustrates a configuration of an exemplary embodiment in which the infrared transmission unit 20*a* includes the first transmitter 21 configured to output the fuel door sensing infrared signal and the second transmitter 22 configured to output the nozzle sensing infrared signal. The infrared reception unit 20*b* may include the plurality of infrared receivers 23 and 24 configured to individually receive two types of signals reflected and received with a time difference or may be one integrated infrared receiver receiving two types of distinguished infrared signals with a time difference.

The infrared reception unit 20*b* may be a type of sensor configured to sense a signal indicating that hydrogen is being charged and may include two infrared receivers 23 and 24 or may be one integrated infrared receiver. When the infrared reception unit 20*b* includes two infrared receivers 23 and 24, one of the two receivers may be configured to receive the fuel door sensing infrared signal returned after being reflected on the fuel door 1 and the other one may be configured to sense the nozzle sensing infrared signal reflected and returned from the charging station-side nozzle joined to the hydrogen charging inlet (receptacle) of the vehicle.

In the present invention, the nozzle may be disposed at the end of the high-pressure hose for supplying hydrogen to the vehicle to charge the hydrogen in the charging station, and may be joined to the hydrogen charging inlet of the vehicle and may be configured to inject the hydrogen supplied through the high-pressure hose into the hydrogen charging inlet of the vehicle while being joined to the hydrogen charging inlet of the vehicle.

Hereinafter, in the present invention, the infrared receiver 23 configured to receive the fuel door sensing infrared signal reflected on the fuel door 1 will be referred to as the first receiver and the infrared receiver 24 configured to receive the nozzle sensing infrared signal reflected on the nozzle connected to the hydrogen charging inlet of the vehicle will be referred to as the second receiver. As the exemplary embodiment of the present invention, FIG. 1 illustrates a configuration of an exemplary embodiment in which the infrared reception unit 20*b* includes the first receiver 23 receiving the fuel door sensing infrared signal and the second receiver 24 receiving the nozzle sensing infrared signal.

Although not illustrated in the drawings, in the fuel cell electric vehicle, since the first and second transmitters 21 and 22 and the first and second receivers 23 and 24 need to be able to transmit the infrared rays with respect to the fuel door 1 of the vehicle and the charging station-side nozzle joined to the hydrogen charging inlet of the vehicle and receive the infrared ray reflected therefrom, both the first and second transmitters 21 and 22 and the first and second receivers 23 and 24 may be installed in the vicinity of the hydrogen charging inlet of the vehicle.

In particular, although not illustrated in the drawing, the first transmitter 21 may be at a position to transmit the infrared rays toward the closed fuel door 1 even in the vicinity of the hydrogen charging inlet and the first receiver 23 may be disposed at a position to receive the infrared rays reflected on the closed fuel door 1. Since the hydrogen charging inlet 2 is not allowed to be exposed by covering the hydrogen charging inlet 2 when the fuel door 1 is closed, the infrared transmission unit 20*a* and the infrared reception unit 20*b* may be positioned in the vicinity of (e.g., proximate to) the hydrogen charging inlet 2 inward the closed fuel door when the fuel door 1 is closed.

Meanwhile, in the exemplary embodiment of the present invention, the first transmitter 21 may be a known infrared transmitter mounted within the vehicle for data communication between the fuel cell electric vehicle and the charging station. In other words, the first transmitter 21 may be a known infrared transmitter configured to transmit the infrared signal for the data communication toward the charging station-side infrared receiver 31 (hereinafter, referred to as a 'charging station receiver') in the vehicle and in this case, the infrared signal transmitted by the first transmitter 21 becomes the fuel door sensing infrared signal for sensing the state of the fuel door 1 for data communication with the charging station side.

As described above, the first transmitter 21 may be an infrared transmitter for both data communication (i.e., infrared communication) and fuel door sensing in the fuel cell electric vehicle. In the present invention, the infrared transmitter for the data communication, installed in the fuel cell electric vehicle may also be used as the fuel door sensing infrared transmitter for sensing the state of the fuel door 1, that is, the first transmitter 21 to achieve communication and integration of the infrared transmitter, and the reduction in number of components.

FIG. 1 illustrates a configuration of an exemplary embodiment in which the first transmitter 21 is used for both the data communication (IR communication) and the fuel door sensing and as illustrated in the drawing, the first transmitter 21 may be configured to transmit the infrared signal to the charging station receiver 31 for the data communication In FIG. 1, the charging station receiver 31 as a receiver used only for data communication between the fuel cell electric vehicle and the charging station may be configured to receive the infrared signal transmitted by the first transmitter 21 and may be disposed at one side of the charging station-side nozzle.

In the exemplary embodiment of FIG. 1, the first transmitter 21 may be a transmitter configured to transmit the fuel door sensing infrared signal for sensing the state of the fuel door 1, but since an output signal of the first transmitter 21 is also the infrared signal for the data communication, the first transmitter 21 may be one that meets a specification of the existing infrared transmitter for the data communication (e.g., IR communication). For example, the first transmitter 21 may be an infrared transmitter for the data communication of the fuel cell electric vehicle capable of outputting the infrared signal at a frequency of 38 kHz as specified in SAE J2799.

In particular, since the first receiver 23 needs to separately receive the infrared signal returned after being reflected on the fuel door 1 in the closed state after being transmitted from the first transmitter 21, a receiver configured to receive the infrared signal at 38 kHz frequency may be used. Since a known infrared transmitter used for the data communication (IR communication) in the fuel cell electric vehicle, such as the first transmitter 21, is configured to output an infrared ray having a strong light intensity, and in particular, output an infrared ray having a strong intensity based on a minimum protocol intensity criterion, the fuel door 1 of the vehicle located farther than the nozzle may be sensed.

Accordingly, the first transmitter 21 for sensing the fuel door may be the infrared transmitter used for the data communication in the fuel cell electric vehicle and in the present invention, a separate infrared transmitter, which reduces the intensity of the light, that is, the second transmitter 22 in which the intensity of the output infrared ray is reduced may be installed and used for nozzle sensing. As described above, the second transmitter 22 may be configured to transmit an infrared signal having a lower intensity than the first transmitter 21 and for example, may be configured to transmit an infrared signal in the range of a frequency of about 100 to 200 kHz and in particular, the infrared signal may have a duty ratio of about 50%.

The second receiver 24 may be configured to separately receive infrared signals returned after being reflected on the nozzle after being transmitted from the second transmitter 22 and for example, may include a receiver configured to receive an infrared signal in the frequency range of about 100 to 200 kHz and having the duty ratio of about 50%. The first transmitter 21 may be an infrared transmitter which is operated by receiving a higher current than the second transmitter 22 to output the light having a stronger intensity than light from the second transmitter 22. For example, the first transmitter 21 may be a transmitter configured to operate at driving current within about 100 mA, and the second transmitter 22 may be a transmitter configured to operate at driving current within about 20 mA.

In the present invention, the specific specifications of the transmitter and the receiver are illustrative and the present invention is not limited thereto. The first transmitter 21 and the first receiver 23 may be configured to transmit and receive the fuel door sensing infrared signal capable of sensing the state of the fuel door 1 and furthermore, as long as the first transmitter 21 and the first receiver 23 are able to transmit and receive the infrared signal for the data communication, the first transmitter 21 and the first receiver 23 are not particularly limited in the frequency, the duty ratio, or the driving current.

Further, as long as the second transmitter 22 and the second receiver 24 are capable of transmitting and receiving the nozzle sensing infrared signal for sensing the nozzle connected to the hydrogen charging inlet of the vehicle, the second transmitter 22 and the second receiver 24 are not particularly limited in the frequency, the duty ratio, or the driving current. However, the first transmitter 21 and the first receiver 23 may have a smaller specification of an infrared output frequency, may have a greater specification of an infrared output intensity, or may have a greater specification of driving current for the operation than the second transmitter 22 and the second receiver 24.

Referring to FIG. 4, the infrared transmission unit 20a and the infrared reception unit 20b may be installed close to the vicinity of the hydrogen charging inlet 2 (e.g., may be proximate to or abutting). As described above, the infrared transmission unit 20a may include two infrared transmitters (that is, the first transmitter and the second transmitter), but may have only one integrated infrared transmitter. Similarly, the infrared reception unit 20b may have two infrared receivers (that is, the first receiver and the second receiver), but may have only one integrated infrared receiver.

In the present invention, the fuel door 1 may be disposed to cover the hydrogen charging inlet (receptacle) 2 in the vehicle. To charge the hydrogen, the fuel door 1 covering the hydrogen charging inlet 2 may be opened to expose the hydrogen charging inlet, but when the hydrogen charging is complete, the fuel door 1 may be closed to conceal the hydrogen charging inlet 2. In particular, since a detailed structure and configuration of the fuel door 1, the hydrogen charging inlet 2, and the charging station-side nozzle of the fuel cell electric vehicle, and a connection or fastening structure between the hydrogen charging inlet and the nozzle are known technical matters, the detailed description thereof will be omitted.

Meanwhile, in the present invention, the infrared signal for the fuel door sensing and the data communication output from the first transmitter 21 needs to be a signal that may be distinguished from the infrared signal for the nozzle sensing output from the second transmitter 22. The controller 10 may be configured to distinguish whether the infrared signals which the controller 10 receives through the first receiver 23 and the second receiver 24 are output from the first transmitter 21 or from the second transmitter 22.

Accordingly, the infrared signal for sensing the fuel door and the infrared signal for sensing the nozzle may be completely different infrared signals in terms of the frequency and the duty ratio. In addition, the controller 10 may be configured to operate the first transmitter 21 and the second transmitter 22 to output respective infrared signals at different times. In other words, the controller 10 may be configured to adjust operation timings of the first transmitter 21 and the second transmitter 22 or adjust both the operation timings of the first receiver 23 and the second receiver 24 together with the transmitters 21 and 22 to prevent signal interference in transmission and reception with a time difference in transmitting and receiving two types of infrared signals.

In an exemplary embodiment, the first transmitter 21 and the first receiver 23 are common and combined transmitter and receiver for both the fuel door sensing and the data communication and during normal data communication, a communication interval (infrared transmission and reception) and a non-communication interval (idle period) are predetermined and temporally distinguished. Therefore, the controller 10 may be configured to driver or operate the first transmitter 21 and the first receiver 23 to transmit and receive the infrared door signal for the fuel door sensing and the data communication in the communication interval of the data communication. Further, the controller 10 may be configured to operate the second transmitter 22 and the second receiver 24 to transmit and receive the infrared signal for the nozzle sensing during the non-communication interval, which is the idle period of the data communication.

FIG. 2 illustrates timing control states of transmitter and receiver operations in the present invention and is a diagram illustrating infrared transmission and reception states. As illustrated, the first transmitter 21 may be configured to transmit infrared signals for the fuel door sensing and the data communication in a predetermined period, for example, a period of about 100 ms, for the data communication, that is, the IR communication and the fuel door sensing detection and in particular, the first transmitter 21 may be configured to transmit the infrared signal for a time within about 30 ms of 100 ms. Simultaneously, the first receiver 23 may be configured to receive the infrared signal output from the first transmitter 21 and the controller 10 may be configured to operate the first receiver 23 to receive the signal based on the time interval during which the first transmitter 21 outputs infrared rays (the first receiver is 'On').

A remaining time excluding the 30 ms of the 100 ms is a communication idle period during which the first transmitter 21 does not output the infrared signal for the data communication and the fuel door sensing and the controller 10 may be configured to operate the second transmitter 22 to output the infrared signal for the nozzle sensing during the idle period in the middle and operate the second receiver 24 to receive the signal (the second receiver is 'On').

As described above, during the communication interval, the first receiver 23 may be turned on and the second receiver 24 may be turned off while the first transmitter 21 is operated to allow the first receiver 23 to receive the infrared signal and in particular, the controller 10 may be configured to determine the state of the fuel door 1 from the infrared signal received through the first receiver 23. During the idle period which is the non-communication interval, the second receiver 24 may be turned on and the first receiver 23 may be turned off while the second transmitter 22 is operated to allow the second receiver 24 to receive the infrared signal and in particular, the controller 10 may be configured to determine that the nozzle is joined from the infrared signal received through the second receiver 24.

As described above, the infrared signal for the fuel door sensing and the infrared signal for the nozzle sensing may be prevented from overlapping, and when both infrared signals overlap, infrared communication connection and hydrogen charge sensing failure may occur. In the present invention, the controller 10 may be configured to determine that the hydrogen charging is performed only when the opened state of the fuel door 1, the entrance of the nozzle, and the connected state of the hydrogen charging inlet are simultaneously sensed, and as a result, a possibility of false sensing of the hydrogen charging may be minimized.

In the exemplary embodiment, the infrared signal for the fuel door sensing and the infrared signal for the nozzle sensing may be transmitted and received by a separate transmitter and a separate receiver, but one integrated transmitter or one integrated receiver may be used (e.g., the infrared transmission unit includes one receiver and the infrared reception unit includes one receiver). In particular, the infrared signal for the fuel door sensing and the infrared signal for the nozzle sensing may be output at a time difference from the transmitter and the signal received through the receiver may be a signal to distinguish the state of the fuel door and the state of the nozzle in the controller 10.

Particularly, the driving current applied to the transmitter may be operated by software or hardware or the infrared output level and frequency output from the transmitter may be adjusted for each time interval using other known output control methods. The infrared signal for the fuel door sensing and the infrared signal for the nozzle sensing which are operated as above may be sequentially output from the transmitter. For example, one transmitter (one light source) may be configured to selectively transmit an infrared signal in about a 38 kHz band and an infrared signal in a about 100 kHz band with a time difference, and the integration of the components achieves reduction in number of components and cost reduction.

When one integrated receiver is configured to sequentially transmit two types of controlled signals, a software filter may be applied to one integrated receiver so that an infrared signal of a specific reception frequency band is received through the receiver and in particular, it may be possible to separately receive the two types of infrared signals, and as a result, by the integration of the receiver, the reduction of the number of components and the reduction of the cost may be achieved.

Meanwhile, referring to FIG. 3, a process of sensing the hydrogen charging according to the present invention will be described below. The process as described below may be executed by an overall controller. First, the frequency and the duty ratio of the infrared signal output by the first transmitter 21 (or the integrated transmitter) may be preset for the fuel door sensing and the data communication and the frequency and the duty ratio of the infrared signal output by the second transmitter 22 (alternatively, the integrated transmitter) for the nozzle sensing may be preset.

A first frequency range and a first duty ratio range for determining the state of the fuel door may be set and a second frequency range and a second duty ratio range for determining the entrance and the connection state of the nozzle may be set. In particular, the first frequency range may be defined as a range including the frequency of the infrared signal for the fuel door sensing output from the first transmitter 21 and may be defined as, for example, a range between 'the frequency of the infrared signal for the fuel door sensing+α1' and 'the frequency of the infrared signal for the fuel door sensing+α2' (α1 and α2 are equal to or different from each other, e.g., α1=α2=2 kHz).

Similarly, the second frequency range may be defined as a range including the frequency of the infrared signal for the nozzle sensing output by the second transmitter 22 and may be defined as, for example, a range between 'the frequency of the infrared signal for the nozzle sensing+α3' and 'the frequency of the infrared signal for the nozzle sensing+α4' (α3 and α4 are equal to or different from each other, e.g., α3=α4=2 kHz).

Similarly, the first duty ratio range may be defined as a range including the duty ratio of the infrared signal for the fuel door sensing outputted from the first transmitter 21 and may be defined as, for example, a range between 'the duty ratio of the infrared signal for the fuel door sensing+β1' and 'the frequency of the infrared signal for the fuel door sensing+β2' and (β1 and β2 are equal to or different from each other, e.g., β1=β2=5%).

Similarly, the second duty ratio range may be defined as a range including the duty ratio of the infrared signal for the nozzle sensing outputted from the second transmitter 22 and may be defined as, for example, a range between 'the duty ratio of the infrared signal for the nozzle sensing+β3' and 'the frequency of the infrared signal for the nozzle sensing+β4' (β3 and β4 are equal to or different from each other, e.g., β3=β4=5%).

Particularly, the first transmitter 21 (or the integrated transmitter) may be operated by the controller 10 to transmit the infrared signal for the fuel door sensing and the data communication having a predetermined frequency band and a predetermined duty ratio (S1) and the first receiver 23 (or the integrated receiver) may be operated by the controller 10 to receive the infrared signal transmitted from the first transmitter 21. In particular, when the frequency and the duty of the infrared signal received through the first receiver 23 satisfy a first condition that the first frequency range and the duty ratio are within the first frequency range and the first duty ratio range, respectively, the controller 10 may be configured to determine that the fuel door 1 is closed or when the first condition is not satisfied, the controller 10 may be configured to determine that the fuel door 1 is open (S2).

When the first condition is not satisfied refers to when the first receiver 23 receives no infrared signal. More specifically, the first receiver 23 may be configured to receive the infrared signal for the fuel door sensing reflected on the fuel door 1 after being transmitted from the first transmitter 21 and the infrared signal for the fuel door sensing may be reflected on the fuel door 1 in a fuel door closed state in which the fuel door 1 covers the hydrogen charging inlet 2 to prevent the hydrogen charging inlet 2 from being exposed.

However, when the fuel door 1 is opened, the infrared signal for the fuel door sensing transmitted by the first transmitter 21 may not be reflected on the fuel door 1 and in particular, the first receiver 23 may not consequently receive the infrared signal (infrared signal for the fuel door sensing) and thus, the first condition is not satisfied. When the controller 10 determines that the fuel door is opened as described above, the controller 10 may be configured to operate the second transmitter 22 (or the integrated transmitter) to transmit the infrared signal for the nozzle sensing having a predetermined frequency band and a predetermined duty ratio (S3).

Subsequently, the second receiver 24 (or the integrated receiver) may be configured to receive the infrared signal transmitted from the second transmitter 22 and in particular, the controller 10 may be configured to determine that the nozzle is connected to the hydrogen charging inlet of the vehicle when a second condition that the frequency and the duty ratio of the infrared signal received via the second receiver 24 are within the second frequency range and the second duty ratio range, respectively is satisfied (S4). When the second condition is not satisfied may refer to when the second receiver 24 receives no infrared signal. More specifically, the second receiver 24 may be configured to receive the infrared signal for the nozzle sensing reflected on the nozzle after being transmitted from the second transmitter 22 and when the nozzle is connected to the hydrogen charging inlet 2, the infrared signal for the nozzle sensing may be reflected on the nozzle.

However, when the nozzle is separated from the hydrogen charging inlet (e.g., disposed at a distance from the inlet), the infrared signal for the nozzle sensing transmitted by the second transmitter 22 may not be reflected on the nozzle and in particularly, the second receiver 24 may not consequently receive the infrared signal (infrared signal for the nozzle sensing) and thus, the second condition is not satisfied. After both the opening of the fuel door 1 and the nozzle connection are sensed as described above, the controller 10 may be configured to determine that the vehicle is being charged with the hydrogen to start the starting restriction (S5). When the hydrogen charging is complete and the nozzle connection or the fuel door opening is not sensed while the starting restriction is performed, that is, when the nozzle is disconnected or the fuel door is closed, the starting restriction may be canceled and the operation of the transmitter may be stopped to stop transmission of the infrared signal (S6, S7, and S8).

The process illustrated in the flowchart of FIG. 3 is exemplary and the present invention is not limited thereto, and the order of some processes may be appropriately changed. For example, in response to determining in the flowchart of FIG. 3 that the fuel door is opened, the infrared signal for the nozzle sensing may be transmitted by the second transmitter 22, but the infrared signal for the nozzle sensing may be transmitted by the second transmitter 22 and thereafter, the controller 10 may be configured to determine the open state of the fuel door. As a result, the system and the method for sensing a hydrogen charge state of a fuel cell electric vehicle according to the present invention may more accurately sense that hydrogen is actually charged in the fuel cell electric vehicle and prevent a safety problem due to rushing of a vehicle while charging high-pressure hydrogen.

According to the present invention, since a non-contact type sensing scheme using light is used, an exposition proof criterion may be fulfilled and an explosion proof related problem in charging the high-pressure hydrogen is easily solved. In other words, it may be possible to implement non-contact type fuel door opening and nozzle sensing functions for transmitting infrared rays and detecting whether hydrogen is charged from the received infrared rays. Therefore, spark generation which occurs due to the contact when the contact type sensing system in the related art is used, and the resulting hydrogen ignition and a risk of explosion may be prevented.

However, in the related art, only an opening state of a fuel door is capable of being sensed by a contact type, but in the present invention, since a hydrogen charging nozzle (a charging station-side nozzle) actually connected to a hydrogen charging inlet (receptacle) of a vehicle for charging hydrogen is sensed in addition to the fuel door, it may be possible to prevent a detection error when applying the non-contact type sensing scheme.

Since both the fuel door and the nozzle are sensed, it may be possible to prevent starting and rushing of the vehicle when the nozzle of the charging station is actually connected to the vehicle for hydrogen charging, not when only the fuel door is opened and it may be possible to prevent a malfunction and an unnecessary starting limitation of the vehicle as compared with a simple configuration of sensing only opening of the fuel door. In other words, only when the hydrogen is actually charged while the nozzle of the charging station is connected to the vehicle, the starting of the vehicle may be limited and the rushing of the vehicle may be prevented.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A method for sensing a hydrogen charge state of a fuel cell electric vehicle, the method comprising:
    receiving, by a controller, a fuel door sensing infrared signal for sensing a fuel door opened while charging hydrogen from an infrared transmission unit;
    receiving, by the controller, a nozzle sensing infrared signal for sensing a charging station-side hydrogen charging nozzle connected to a hydrogen charging inlet of a vehicle the infrared transmission unit;
    receiving, by the controller, an infrared signal from an infrared reception unit; and
    determining, by the controller, that the vehicle is being charged with hydrogen in response to sensing an open state of the fuel door and a hydrogen charging inlet connection state of the hydrogen charging nozzle based on the infrared signal received by the infrared reception unit,
    wherein the controller is configured to compare a frequency and a duty ratio of the infrared signal received through the infrared reception unit with a first frequency range and a first duty ratio range which are set and when a first condition that the corresponding frequency and duty ratio are within the first frequency range and the first duty ratio range, respectively is satisfied, the controller is configured to sense that the fuel door is closed and when the first condition is not satisfied, the controller is configured to sense that the fuel door is opened.

2. The method of claim 1, wherein the fuel door sensing infrared signal and the nozzle sensing infrared signal are signals having different frequency bands.

3. The method of claim 1, wherein the fuel door sensing infrared signal and the nozzle sensing infrared signal are signals having different frequency bands and duty ratios.

4. The method of claim 1, further comprising:
    sequentially transmitting, by the infrared transmission unit, the fuel door sensing infrared signal and the nozzle sensing infrared signal with a time difference.

5. The method of claim 1, wherein the infrared transmission unit includes a first transmitter and a second transmitter, the method further comprising:
    transmitting the fuel door sensing infrared signal via the first transmitter, and
    transmitting the nozzle sensing infrared signal via the second transmitter.

6. The method of claim 5, wherein the first transmitter is a communication infrared transmitter configured to transmit an infrared signal to a charging station-side infrared receiver and configured to perform data communication between the fuel cell electric vehicle and a charging station.

7. The method of claim 1, wherein the infrared reception unit includes:
    a first receiver configured to receive the fuel door sensing infrared signal transmitted from the infrared transmission unit and thereafter, reflected on the fuel door, and
    a second receiver configured to receive the nozzle sensing infrared signal transmitted from the infrared transmission unit and thereafter, reflected on the hydrogen charging nozzle.

8. The method of claim 1, wherein the infrared transmission unit includes a communication infrared transmitter configured to transmit the infrared signal to a charging station-side infrared receiver and configured to perform the data communication between the fuel cell electric vehicle and a charging station.

9. The method of claim 1, wherein the controller is configured to compare the frequency and the duty ratio of the infrared signal received through the infrared reception unit with a second frequency range and a second duty ratio range which are set and when a second condition that the corresponding frequency and duty ratio are within the second frequency range and the second duty ratio range, respectively is satisfied, the controller is configured to sense that the hydrogen charging nozzle is connected to the hydrogen charging inlet.

* * * * *